(12) United States Patent
Takemoto

(10) Patent No.: US 7,081,918 B2
(45) Date of Patent: Jul. 25, 2006

(54) IMAGE PROCESSING METHOD, IMAGE PROCESSING APPARATUS AND RECORDING MEDIUM STORING PROGRAM THEREFOR

(75) Inventor: Fumito Takemoto, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 969 days.

(21) Appl. No.: 09/842,908

(22) Filed: Apr. 27, 2001

(65) Prior Publication Data

US 2002/0036696 A1 Mar. 28, 2002

(30) Foreign Application Priority Data

| Apr. 28, 2000 | (JP) | ............................ 2000-130526 |
| Apr. 28, 2000 | (JP) | ............................ 2000-130600 |
| Apr. 28, 2000 | (JP) | ............................ 2000-130601 |
| Mar. 19, 2001 | (JP) | ............................ 2001-078312 |
| Mar. 19, 2001 | (JP) | ............................ 2001-078366 |

(51) Int. Cl.
*H04N 9/73* (2006.01)
*H04N 5/225* (2006.01)
*G03F 3/08* (2006.01)

(52) U.S. Cl. ............................ 348/223.1; 348/207.99; 358/518

(58) Field of Classification Search ...................... None
See application file for complete search history.

(56) References Cited

U.S. PATENT DOCUMENTS

| 5,668,596 | A  | * | 9/1997 | Vogel ........................ 348/222.1 |
| 6,744,920 | B1 | * | 6/2004 | Sakaida ...................... 382/167 |
| 6,795,212 | B1 | * | 9/2004 | Ichikawa ..................... 358/1.9 |
| 6,850,272 | B1 | * | 2/2005 | Terashita .................. 348/223.1 |
| 2002/0140825 | A1 | * | 10/2002 | Terashita .................. 348/222.1 |

FOREIGN PATENT DOCUMENTS

| JP | 10208034 | 8/1998 |
| JP | 11069186 | 3/1999 |
| JP | 11220619 | 8/1999 |
| JP | 11220687 | 8/1999 |

* cited by examiner

*Primary Examiner*—David Ometz
*Assistant Examiner*—Luong T. Nguyen
(74) *Attorney, Agent, or Firm*—Birch, Stewart, Kolasch & Birch, LLP

(57) ABSTRACT

A high-quality processed image can be obtained by eliminating an effect of a tone characteristic and a color characteristic caused by a model of a digital camera from image data obtained by the digital camera, while colors in processed image data are prevented from being ruined. A model tone characteristic absorption processing unit absorbs the model tone characteristic of the digital camera by using a tone correction curve corresponding to the model, and image data not depending on the model are obtained. An AE/AWB processing unit carries out exposure correction on the image data, and a tone correction unit carries out tone correction thereon for printing. Miscellaneous processing units carry out color correction by using a model color characteristic profile generated to correct colors approximately.

16 Claims, 8 Drawing Sheets

IMAGE PROCESSING METHOD, IMAGE PROCESSING APPARATUS AND RECORDING MEDIUM STORING PROGRAM THEREFOR

BACKGROUND OF THE INVENTION

1. Field of the Invention

The present invention relates to an image processing method and an image processing apparatus for carrying out tone correction processing on image data obtained by a digital camera, and to a computer-readable recording medium storing a program to cause a computer to execute the image processing method. The present invention also relates to a method of generating tone conversion tables used for carrying out the tone correction processing on the image data, and to a method of generating a model color characteristic profile used for carrying out color correction processing on the image data.

2. Description of the Related Art

An image obtained by a digital camera is recorded as digital image data in an internal memory installed in the digital camera or in a recording medium such as an IC card, and the image can be displayed by using a printer or a monitor based on the digital image data that have been recorded. In the case where such an image obtained by a digital camera is printed, the image is expected to have as high a quality as a print generated from a negative film.

A digital camera comprises an optical system (such as a diaphragm of a lens, a shutter, and a flash), an imaging system (such as CCDs and a signal processing system), a control system (AE, AWB, and AF mechanisms), and a recording and reproduction system (for compression/decompression, memory control, and display). As factors affecting quality of a reproduced image, color temperature of the flash, AE (automatic exposure control) processing, AWB (automatic white balance) processing, CCD color separation filters, the number of pixels, tone conversion, and matrix operation for obtaining luminance/color difference signals can be listed, in addition to performance of the lens. In a digital camera, acquisition of digital image data enabling reproduction of a high quality image is aimed for by controlling these factors.

Therefore, a digital camera has an AE function, an AWB function, and image processing functions such as tone conversion and color correction. Since digital image data obtained thereby have been subjected to the image processing described above, a reproduction apparatus can reproduce an image represented by the image data. However, AE processing and AWB processing is generally carried out in a digital camera for reproduction of image data on a monitor, and AE processing or AWB processing may not be available in some cases. Furthermore, image data may have been generated by inappropriate exposure such as overexposure, underexposure, or inappropriate flashing. Therefore, when the image data are printed, tone correction and AE/AWB processing appropriate for printing are necessary. Here, the AE/AWB processing at the time of printing is called printing AE/AWB processing, for distinction from an AE processing function and an AWB processing function in the digital camera.

For this processing, a method of correcting exposure and white balance has been proposed. In this method, an average is found for each of RGB color signals comprising image data obtained by a digital camera, as has been described in Japanese Unexamined Patent Publication No. 11(1999) - 20619, for example. A correction value for causing the average to become a target value appropriate for printing is then found. By using the correction value, exposure and white balance can be adjusted.

Meanwhile, as the factors affecting a quality of a reproduced image, color temperature of a flash, AE processing, AWB processing, CCD color separation filters, the number of pixels, tone conversion, and matrix operation for obtaining luminance/color difference signals can be listed. These factors vary depending on a model or manufacturer of a digital camera, and the tone conversion is deeply related to the printing AE/AWB processing. In the above method, image data used for the printing AE/AWB processing may be image data converted into antilogarithms from original image data obtained by a digital camera, or image data having been subjected to density conversion. Therefore, the image data having a tone characteristic depending on a model of the digital camera are analyzed by the printing AE/AWB processing.

For this reason, a correction value used for printing is hard to obtain, since the image data to be analyzed depend on the model of the digital camera when the printing AE/AWB processing is carried out. As a result, printing needs to be carried out repeatedly by a printer to correct the image data by trial and error, which is extremely inefficient.

As for colors, since a color characteristic varies with a model of a digital camera, a reproduced image has the color characteristic of the model of the digital camera when printed by a printer.

Therefore, for tone correction, a method of carrying out image processing according to a model of a digital camera has been described in Japanese Unexamined Patent Publication No. 10(1998)-208034, for example. In this method, more tones are assigned to an area having a high luminance distribution density by analyzing an image, and tone conversion tables are automatically generated for each image in this manner.

Furthermore, a system for carrying out image processing on image data obtained by a digital camera by finding image processing conditions different for each model of a digital camera has been proposed in Japanese Unexamined Patent Publication No. 11(1999)-220687.

Regarding correction of a color characteristic varying with a model of a digital camera, a profile comprising 3D conversion tables for R, G, and B is generated by conventional color management software when image data obtained by a digital camera are converted into a signal output to an output apparatus such as a printer. By this conversion using the profile, image data not affected by the color characteristic of the digital camera are obtained. The profile comprises data for converting an input signal obtained by the digital camera into calorimetric values of a subject.

Moreover, another method for setting a color correction function by using a color chart after adjustment of gray balance using a gray chart has also been proposed in Japanese Unexamined Patent Publication No. 11(1999)-69186.

In the field of printing, image data are obtained by a device such as a scanner, and processing to eliminate an effect of tone and color characteristics of the device is necessary when the image data are output from an output apparatus such as a printer. In this field, the tone characteristic and the color characteristic of the device have been conventionally corrected by using two methods. In one of the methods, profiles for correcting tone characteristics and color characteristics of respective devices are stored in a memory of an image processing apparatus, and information on a model of the device is input to the image processing apparatus. The image processing apparatus selects one of the profiles based on the device information to carry out the tone correction and the color correction on the image data. In the other method, a profile for correcting a tone characteristic and a color characteristic of a device such as a scanner is output from the device to an image processing apparatus, together with image data. The image processing apparatus carries out tone correction and color correction based on the profile accompanying the image data.

However, in the system described in Japanese Unexamined Patent Publication No. 11(1999)-220687, printing AE/AWB processing according to a model of a digital camera is not mentioned. Furthermore, when tone correction is carried out on image data in the system, a tone correction processing condition is determined according to the model of the digital camera so that the tone correction processing condition is used in tone correction according to the model of the digital camera and in tone correction for printing. Therefore, printing AE/AWB processing is not carried out on the image data after the tone correction. Consequently, the image data to be processed in this system are limited to only the image data obtained by the digital camera. As a result, an appropriate correction value is not found for printing and an effect of printing AE/AWB processing is not expected. For this reason, a high-quality reproduced image cannot be obtained.

In the system described in Japanese Unexamined Patent Publication No. 10(1998)-208034, since only image analysis information is used for generating the tone conversion tables, an image generated by using the tables may not be appropriately processed.

For color correction, the conventional color management software corrects the color characteristic varying with the model of the digital camera by converting the input signal obtained by the digital camera into the calorimetric values of the subject. Therefore, when the color characteristic of the digital camera is substantially different from a color characteristic of the subject, an image after the color correction has a partially sparse area in a color space, easily ruining colors, especially in gradation.

In the method described in Japanese Unexamined Patent Publication No. 11(1999)-69186, absorption of a tone characteristic of a digital camera is not emphasized but correction of gray balance and colors is weighted. Therefore, a tone characteristic of a digital camera is not corrected and remains in image data.

In one of the image processing methods in printing, the model of the device such as a scanner that obtained the image data needs to be input. Therefore, an operator who carries out the image processing is assumed to know the model of the device. In the field of printing, the device such as a scanner is generally located near an image processing apparatus, and the model thereof does not change frequently. Therefore, the operator easily understands the model of the device. However, digital cameras have much wider varieties of models and the models change frequently. Moreover, a digital camera that obtained image data to be processed is not necessarily located in a laboratory for printing. Therefore, it is not practical for the operator to know the model of the digital camera. Furthermore, since an amount of data of the profile is large, in a system for processing images obtained by digital cameras by transferring the images via a network, the other method used in printing, that is, the method of outputting the profile together with image data to an image processing apparatus, is not practical.

SUMMARY OF THE INVENTION

The present invention has been conceived based on consideration of the above problems. An object of the present invention is therefore to provide an image processing method, an image processing apparatus, a recording medium storing a program therefor, and a tone conversion table generation method for carrying out image processing on image data in order to generate a high-quality reproduced image regardless of a model of a digital camera that obtained the image data, and to provide a method of generating a model color characteristic profile for correcting a color characteristic of a digital camera while absorbing a tone characteristic varying with a model of the digital camera.

An image processing method of the present invention is a method for obtaining processed image data by carrying out tone correction processing on image data obtained by a digital camera. The image processing method comprises the steps of:

carrying out pre-processing according to a model of the digital camera on the image data to absorb a model tone characteristic of the digital camera of the model by using a model tone characteristic profile of the digital camera; and obtaining the processed image data by carrying out automatic exposure control processing and/or automatic white balance processing followed by the tone correction processing on the image data on which the pre-processing has been carried out.

The "model tone characteristic profile" refers to data that are used for generating data to correct the tone characteristic of the digital camera of the model. The model tone characteristic profile may be data whose input signal is an actual signal of a subject (that is, a signal corresponding to the case of $\gamma=1$ for the subject) and whose output signal is a signal obtained by photographing the subject with the digital camera and thus having the model tone characteristic of the digital camera. By calculation using the data, the actual signal of the subject, that is, a signal having a tone characteristic not depending on the digital camera and not affected by the tone characteristic of the digital camera can be obtained from the signal obtained by photographing the subject with the digital camera. For the sake of easy use and easy calculation, it is preferable for the model tone characteristic profile to be generated in order to directly correct the model tone characteristic of the digital camera by using the signal obtained by the camera as the input signal and by using the actual signal of the subject as the output signal. The model tone characteristic profile can be a tone characteristic correction curve having the input signal and the output signal as an ordinate and an abscissa, respectively. Alternatively, the model tone characteristic profile can be a look-up table (LUT) in which values in the tone characteristic correction curve are represented as a relationship between an input signal and an output signal of the table.

The "pre-processing to absorb a model tone characteristic of the digital camera by using the model tone characteristic profile" refers to processing to obtain image data not depending on the model tone characteristic by correcting the image data obtained by the digital camera with the model tone characteristic profile.

Information indicating the model of the digital camera may be input by being added to the image data obtained by the digital camera or by a manual input.

In the case where the information indicating the model of the digital camera is not available, the model tone characteristic of the digital camera can be corrected by using a default model tone characteristic profile. The case where "the information indicating the model of the digital camera is not available" refers to a situation in which the image data obtained by the digital camera do not accompany the camera model information and the camera model information is not input manually. Alternatively, the case refers to a situation in which the model tone characteristic profile corresponding to the model of the digital camera is not available. As the default model tone characteristic profile, a tone characteristic profile that is most likely to be adopted by a digital camera is preferably used.

Image data obtained by a digital camera are generally compressed. Therefore, it is preferable for the image processing method of the present invention to enable decompression of the image data obtained by the digital camera. It is also preferable for the image data obtained by the digital camera to be received via a network.

Furthermore, it is preferable for image data obtained by reduction processing carried out on the image data obtained by the digital camera to be used as a target of the tone correction processing.

An image processing apparatus of the present invention is an apparatus for obtaining processed image data by carrying out tone correction processing on image data obtained by a digital camera. The image processing apparatus comprises:

storage means for storing model tone characteristic profiles corresponding to models of digital cameras;

input means for inputting information indicating a model of the digital camera that obtained the image data;

model tone characteristic absorption means for selecting one of the model tone characteristic profiles corresponding to the model of the digital camera from the storage means based on the information on the model of the digital camera input from the input means, and for carrying out pre-processing to absorb a model tone characteristic of the digital camera on the image data by using the model tone characteristic profile;

exposure and/or white balance correction means for carrying out automatic exposure control processing and/or automatic white balance processing on the image data obtained by the model tone characteristic absorption means and thus having a tone characteristic not depending on the model of the digital camera; and tone correction means for carrying out the tone correction processing on the image data obtained by the exposure and/or white balance correction means.

It is preferable for information indicating the model of the digital camera to be added to the image data obtained by the digital camera so that the input means can read the information added to the image data. It is more preferable that the information on the model of the digital camera can also be input manually from the input means.

The storage means stores a default model tone characteristic profile. In the case where the information indicating the model of the digital camera is not available, it is preferable for the model tone characteristic absorption means to carry out the pre-processing by using the default model tone characteristic profile.

Furthermore, since image data obtained by a digital camera are generally compressed, it is preferable for the image processing apparatus of the present invention to further comprise decompression means for decompressing the image data to be provided for the pre-processing.

It is also preferable for the image processing apparatus of the present invention to further comprise reception means for receiving the image data obtained by the digital camera via a network.

In the image processing apparatus of the present invention, it is preferable for the image data obtained by the digital camera to be provided to the model tone characteristic absorption means after being reduced.

The image processing method of the present invention may be provided as a computer-readable recording medium storing a program to cause a computer to execute the image processing method.

In the method, the apparatus, and the program described above, the processing to absorb the model tone characteristic of the digital camera is carried out on the image data obtained by the digital camera. The image data are then subjected to the automatic exposure control/automatic white balance processing for printing and the tone correction processing appropriate for an image reproducing apparatus such as a printer. The processing described above may be carried out in the order described above. However, the processing may not be carried out in each step described above. Instead of actually carrying out the processing, processing conditions for each step, that is, model tone characteristic absorption processing conditions, printing AE/AWB processing conditions, and tone correction processing conditions may be determined respectively in the steps of carrying out the model tone characteristic absorption processing, the printing AE/AWB processing, and the tone correction processing so that the image processing can be carried out by using processing conditions in which all the processing conditions described above are incorporated.

A tone conversion table generation method of the present invention is a method of generating tone conversion tables used at the time of obtaining processed image data by carrying out tone conversion processing on image data obtained by a digital camera. The tone conversion table generation method comprises the step of:

using a model tone characteristic profile generated for a model of the digital camera and representing a tone characteristic of the digital camera that obtained the image data.

It is preferable for the model tone characteristic profile to be generated in the following manner. First, a gray chart is photographed by the digital camera of the model in different photographing conditions, and values of logY are obtained for gray patches in the gray chart from RGB values obtained by the digital camera (hereinafter called digital camera RGB values). Luminance of the respective gray patches in the gray chart is measured in each of the photographing conditions, and converted into logarithms. Data relating the logarithmic luminance values to the values of logY for the respective gray patches are obtained, and the model tone characteristic profile is generated based on the data.

It is more preferable for the model tone characteristic profile to be generated by finding an approximation curve based on the data relating the logarithmic luminance values and the values of logY obtained in the same photographing condition for the respective gray patches.

When the gray chart is photographed by the digital camera in each of the photographing conditions, photographing is preferably carried out while an exposure condition is changed from overexposure to underexposure. Among image data sets obtained by using the varying exposure condition, an image data set whose brightest gray patch has a difference from a second-brightest gray patch thereof and is not saturated but most overexposed is selected. The digital camera RGB values corresponding to the respective gray patches are found by using the selected image data set, and the values of logY found from the digital camera RGB values are preferably used to generate the approximation curve.

It is preferable for the photographing conditions to include at least one of conditions comprising flash on/off conditions, sensitivity, and a type of a photographing light source such as automatic, fine weather, cloudy weather, in fluorescent light, and in tungsten light.

In the case where gray balance needs to be adjusted, it is preferable for model tone characteristic profiles corresponding to R and B to be generated based on differences between R and G and between B and G, with the model tone characteristic found in the above manner being used as the model tone characteristic profiles corresponding to G.

A model color characteristic profile generation method of the present invention comprises the steps of:

obtaining image data for setting color correction parameters by using a digital camera of a model;

carrying out correction of a model tone characteristic of the digital camera of the model on the image data for setting the color correction parameters with reference to a model tone characteristic profile representing the model tone characteristic of the digital camera; and generating a model color characteristic profile by setting the color correction parameters for approximately correcting a model color characteristic of the digital camera of the model represented by the image data for setting the color correction parameters after the correction of the model tone characteristic.

It is preferable for the model color characteristic profile generated by using the method of the present invention to correct at least one, preferably two or more, of lightness, chroma, and hue of at least one color.

When the model color characteristic profile of the digital camera is generated, it is preferable for the image data for setting the color correction parameters to be obtained by photographing Macbeth Color Checker with the digital camera, in order to obtain the color correction parameters accurately and easily.

The "model color characteristic profile" in the present invention refers to data for correcting the color characteristic of the digital camera that varies with the model thereof. The model color characteristic profile is used for converting an input signal obtained by the digital camera and thus having the model color characteristic of the camera into an output signal corrected approximately.

"Approximately correcting a model color characteristic" refers to correction of the model color characteristic of the digital camera in the following manner. For example, calorimetric values of a subject are used as target values. Differences between the calorimetric values of the subject and values of CIE1976 lightness $L^*$ ($=L$), chroma $C^*$ ($=C$) and hue angle HA ($=H$) in an LAB color specification system obtained by converting RGB values of the image data obtained by photographing the subject with the digital camera are multiplied by a coefficient $\alpha$ ($0 \leq \alpha \leq 1$). The values obtained in this manner are used as the data for correcting the model color characteristic of the digital camera (that is, as the model color characteristic profile). As the calorimetric values of the subject, values of L, C, and H of RGBCMY in the LAB color specification system obtained by measuring Macbeth Color Checker can be used, for example.

According to the image processing method and the image processing apparatus of the present invention, the pre-processing to absorb the model tone characteristic is carried out according to the model of the digital camera. Therefore, performance of the printing AE/AWB processing can be improved since the image data not having the model tone characteristic can be analyzed. As a result, are produced image having a high quality can be obtained, regardless of the model of the digital camera.

Furthermore, since the printing AE/AWB processing is carried out after the model tone characteristic of the digital camera is absorbed and the tone correction processing appropriate for printing is carried out if desired. Therefore, the reproduced image becomes high quality regardless of the model of the digital camera.

Moreover, since the pre-processing to absorb the model tone characteristic of the digital camera is carried out in the image processing method and in the image processing apparatus of the present invention by selecting one of the model tone characteristic profiles based on the information on the model of the digital camera, the image processing can be carried out if the information on the model is added to the image data as tag information thereof. Therefore, an amount of the data to be transferred is small. Especially, if the present invention is applied to a system where image data are sent and received via a network, a load on the network can be reduced and transmission time can be shortened.

If the information on the model of the digital camera can be input manually in the image processing method and in the image processing apparatus of the present invention, the case where the information is not added to the image data can be dealt with, which is convenient.

Moreover, if the processing is carried out by using the default model tone characteristic profile in the case where the model of the digital camera that obtained the image data is not known, a new model of digital camera can be dealt with.

According to the tone conversion table generation method of the present invention, the model tone characteristic profile to absorb the model tone characteristic of the digital camera that obtained the image data is independently available. Therefore, pre-processing to absorb only the model tone characteristic can be carried out according to the model. As a result, in printing AE/AWB processing, analysis can be can be carried out on the image data having a tone characteristic not depending on the model. In this manner, performance of the printing AE/AWB processing can be improved. Furthermore, since data to be processed by reference tone processing for printing and/or nonlinear correction processing of highlight and shadow areas can be unaffected by the model, the processing can be carried out fast and accurately. Therefore, a reproduced image having a high quality can be obtained regardless of the model of the digital camera.

By using the model tone conversion tables of the present invention, the processing to absorb the model tone characteristic can be separated from the tone correction processing appropriate for a printer. Therefore, the processing to absorb the model tone characteristic does not need to change when another printer is used. As a result, an amount of calculation and an amount of data used therein can be reduced, which leads to reduction in cost.

When the model tone characteristic profile is generated in the tone conversion table generation method of the present invention, the gray chart is photographed by using the digital camera in the exposure condition varying from overexposure to underexposure, and the digital camera RGB density values corresponding to the respective gray patches can be obtained by using the image data set whose brightest gray patch is different from a second-brightest gray patch thereof and not saturated but most overexposed. Therefore, the model tone characteristic of the digital camera can be absorbed, and flare caused by a lens and CCDs of the digital camera can also be corrected. Moreover, since the image data set selected in the above manner does not represent an evenly bright highlight area and an evenly dark shadow area, the image data become reliable, and performance of the tone conversion processing can be improved.

If the model tone characteristic profile is generated in the present invention for the case of photographing with or without flash, and for the case of each photographing light source such as automatic, in fine weather, in cloudy weather, in fluorescent light, and in tungsten light, the data for the profile can be made more reliable. Since tone correction to cause noise to become inconspicuous has already been carried out in the digital camera, the model tone characteristic can be corrected more accurately if the model tone characteristic profile is generated for each sensitivity level (a degree of causing noise to become inconspicuous).

The same model tone characteristic profile generated by the tone conversion table generation method of the present invention may be used for the RGB colors in order not to unbalance the gray balance However, since only RGB gains are controlled in an antilogarithmic space in the digital camera in the case where the gray balance is changed, the model tone characteristic profiles corresponding to R and B can be obtained by using the density differences between R and G and between B and G. Therefore, the gray balance can be adjusted easily upon necessity.

According to the model color characteristic profile generation method of the present invention, the model color characteristic profile is generated so as to correct the image data obtained by the digital camera approximately. Therefore, processed image data can avoid a sparse area generated in a color space, and colors in gradation can be prevented from being ruined. As a result, an image having a higher quality can be obtained.

DESCRIPTION OF THE PREFERRED EMBODIMENTS

Hereinafter, embodiments of the present invention will be explained with reference to the accompanying drawings.

Figure 1:
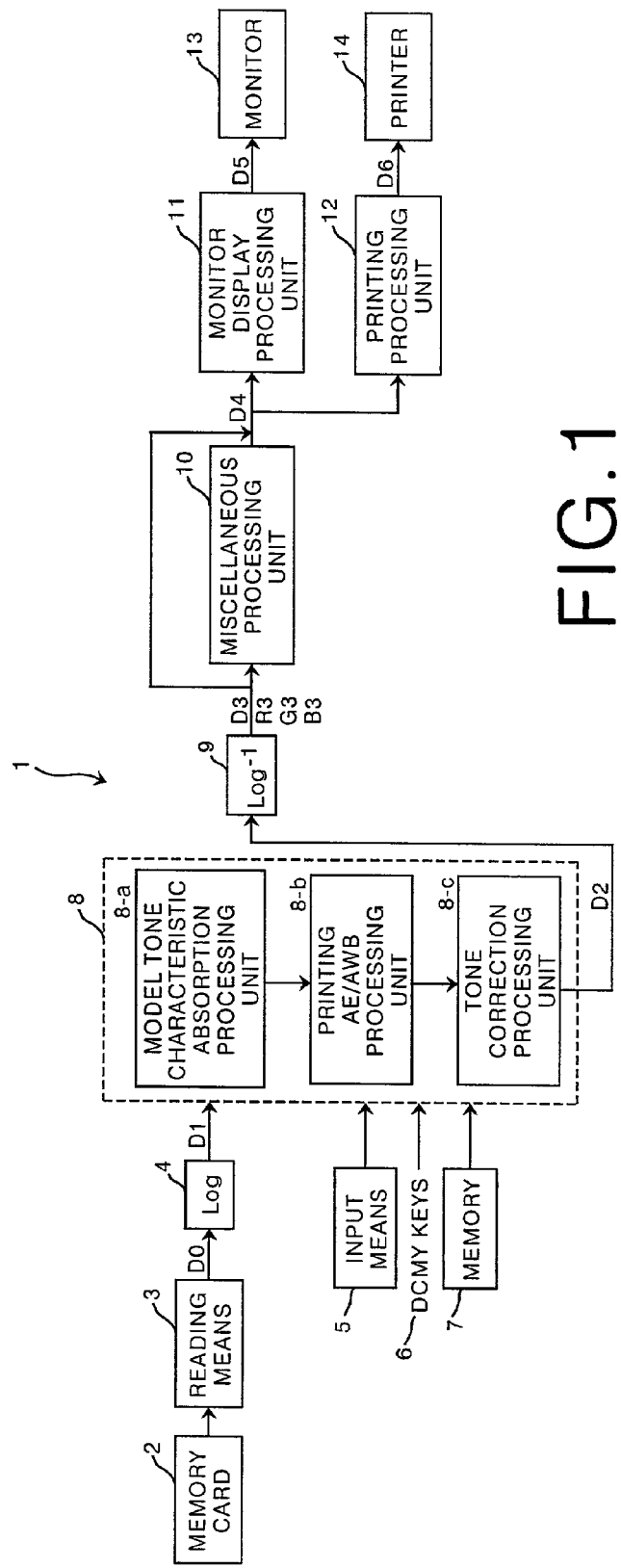
FIG. 1 is a block diagram showing a configuration of an image processing apparatus as a first embodiment of the present invention.

FIG. 1 is a block diagram showing a configuration of an image processing apparatus as a first embodiment of the present invention. As shown in FIG. 1, an image processing apparatus 1 in the first embodiment comprises reading means 3 for reading image data D0 comprising color data R0, G0, and B0 from a memory card 2 storing the image data D0 obtained by photographing a subject with a digital camera, logarithmic conversion means 4 for obtaining image data D1 by carrying out logarithmic conversion on the image data D0, input means 5 and DCMY keys 6 for carrying out various kinds of inputs to tone correction means 8 that will be explained later, a memory 7 storing a plurality of tone characteristic correction curves, the tone correction means 8 for obtaining image data D2 by carrying out tone correction processing on the image data D1, inverse logarithmic conversion means 9 for obtaining image data D3 comprising color data R3, G3, and B3 by carrying out inverse logarithmic conversion on the image data D2, miscellaneous processing means 10 for obtaining image data D4 by carrying out desired image processing such as color correction on the image data D3, a monitor display processing unit 11 for obtaining display image data D5 to be displayed on a monitor 13 by carrying out processing for monitor display such as sRGB conversion on the image data D4, a printing processing unit 12 for obtaining image data D6 by carrying out processing for printing such as sharpness processing on the image data D4, the monitor 13 for displaying the display image data D5, and a printer 14 for outputting the image data D6.

The reading means 3 comprises a card reader and the like for reading the image data from the memory card 2. Since the image data read from the memory card 2 are generally compressed, the reading means 3 comprises decompression means not shown, and the image data read from the memory card 2 are decompressed by the decompression means and used as the image data D0. The image data D0 have information indicating a model of the digital camera that obtained the image data (hereinafter called camera model information) as tag information of the image data D0, and the camera model information is also read. As a standard for recording the camera model information as the tag information, "Baseline TIFF Rev 6.0 RGB Full Color Image" adopted as a non-compression file format of an Exif file can be used, for example. The tag information also includes information indicating use of flash (hereinafter called flash information) in the case of flash photographing. The image data D0 are obtained by photographing the subject with the digital camera. Therefore, the digital camera carries out AE/AWB processing and tone characteristic correction processing during the photographing, and the image data have a γ characteristic that is not necessarily 1 for the subject. The input means 5 comprises a keyboard, a mouse, and the like for carrying out various kinds of inputs to the tone correction means 8. A type of tones used as a reference at the time of correcting tones by a tone correction processing unit 8-C that will be explained later (hereinafter called reference tones) is input from the input means 5. For example, tones for a standard situation, for cloudy weather, for backlight, and for flash photographing are selectable. By selecting the type of reference tones with the input means 5, a tone curve representing the selected reference tones is read from the memory 7 and used by the tone correction processing unit 8-C. In the case where tone curves including the reference tone curve need to be corrected as desired to obtain desired tones, the tone curves are displayed on the monitor 13 and corrected by using the input means 5.

In the case where the image data D0 do not have the camera model information, the camera model information can be input manually from the input means 5.

The DCMY keys 6 comprise four keys to correct density D of an entire image, and densities of cyan (C), magenta (M)

and yellow (Y). Depending on how many times each of the keys is pressed down, the density of the entire image or each of the colors can be changed. Correction of the tone curves input from the input means 5 and the change of the densities input from the DCMY keys 6 are displayed on the monitor 13 in real time.

The memory 7 stores reference tone characteristic correction curves for the standard situation, for cloudy weather, for backlight, and for flash photographing, as well as model tone characteristic correction curves in accordance with models of digital cameras and a default tone curve.

Figure 2:
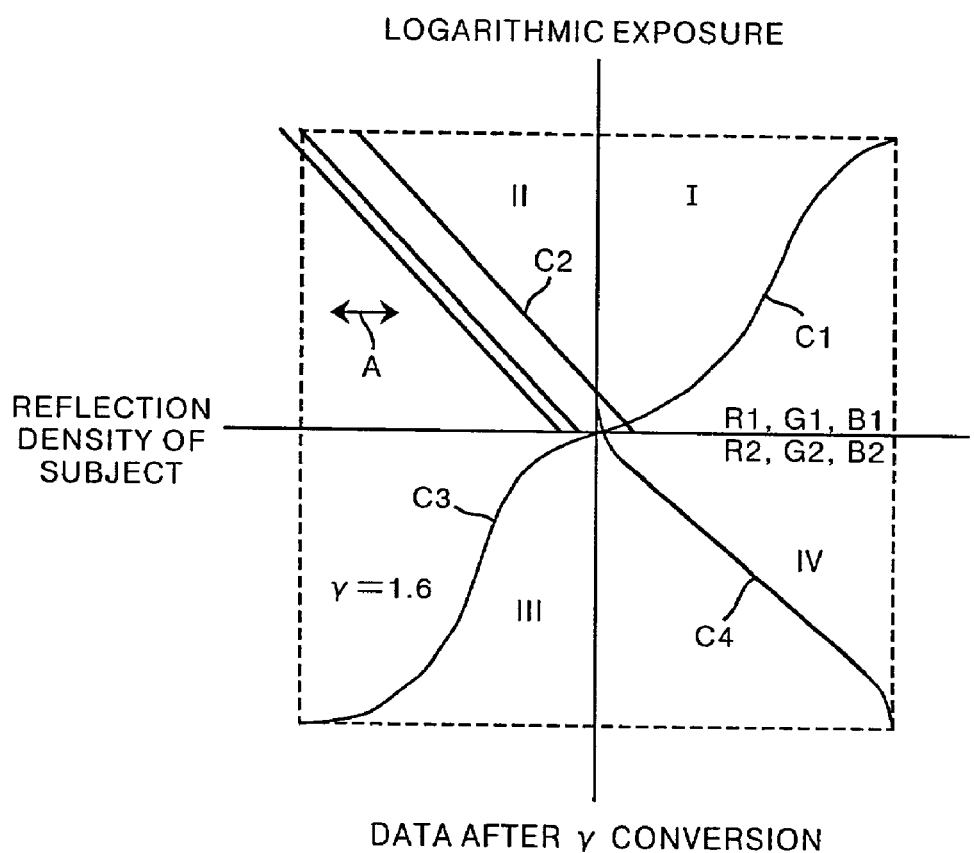
FIG. 2 is a diagram for explaining tone conversion processing in the image processing apparatus shown in FIG. 1.

The tone correction means 8 carries out the tone correction processing on the image data D1 that have been subjected to the logarithmic conversion, according to procedure shown in FIG. 2. First to fourth quadrants of FIG. 2 show processing carried out in a model tone characteristic absorption processing unit 8-a, a printing AE/AWB processing unit 8-b, and the tone correction processing unit 8-c. The tone correction is carried out on color data R1, G1, and B1 comprising the image data D1, and color data R2, G2, and B2 comprising the image data D2 are obtained.

The model tone characteristic absorption processing unit 8-a reads a model tone characteristic correction curve C1 (hereinafter called model tone curve C1) corresponding to the model of the digital camera (whose generation will be explained later) from the memory 7, based on the camera model information read by the reading means 3 or input from the input means 5. As shown in the first quadrant in FIG. 2, the color data R1, G1, and B1 are converted by the model tone curve C1, and data representing logarithmic exposure can be obtained. As has been described above, quality of are produced image varies, depending on a model or manufacturer of a digital camera. Therefore, the model tone curve C1 has been generated to absorb a tone characteristic of the digital camera of the model so that a high quality image can be obtained regardless of the model of the digital camera. The image data obtained by this processing have a tone characteristic not depending on the model. In other words, the data have the tone characteristic corresponding to $\gamma=1$ for the subject.

The model tone characteristic absorption processing unit 8-a carries out the model tone characteristic absorption processing by reading a default model tone curve C1' from the memory 7 in the case where the camera model information is neither added to the image data D0 nor input from the input means 5.

The second quadrant in FIG. 2 shows exposure correction (including white balance), that is, the processing carried out by the printing AE/AWB processing unit 8-b. Since the AE/AWB processing by the digital camera is not optimal for reproduction of an image as a print, exposure is corrected to become optimal for printing. A line C2 for correcting the exposure and white balance is basically a line passing through the origin. The printing AE/AWB processing unit 8-b estimates a correction amount necessary for optimally correcting the exposure and white balance for printing, for each of the RGB colors comprising the image data obtained by the model tone characteristic absorption processing means 8-a. Based on the correction amount, the printing AE/AWB processing unit 8-b translates the line C2 in either direction shown by an arrow A to correct the exposure and white balance. By this procedure, image data whose exposure has been corrected can be obtained.

As a method of finding the correction amount for the printing AE/AWB processing, an average is found for each of the RGB colors comprising the image data, and the correction amount is found to cause the average to become a target value appropriate for printing, as has been described in Japanese Unexamined Patent Publication no. 11 (1999)-220619, for example. In the present invention, the image data used in analysis for the printing AE/AWB processing are the image data not depending on the model of the digital camera, since the model tone characteristic in the image data has been absorbed. Therefore, performance of the analysis of the printing AE/AWB processing is improved, and the correction value becomes accurate and more appropriate for printing. As a result, the image data after this processing become high quality.

The tone correction processing unit 8-c carries out correction by using a reference tone characteristic correction curve C3 (hereinafter called reference tone curve C3) shown in the third quadrant of FIG. 2. As the reference tones, the tones for the standard situation, for cloudy weather, for backlight, and for flash photographing are selectable. The tone correction processing unit 8-c reads the reference tone curve C3 representing the reference tones selected by the input means 5 from the memory 7, and carries out the tone correction by using the reference tone curve C3. In order to harden tones at the time of printing to cause an image to look esthetic, the reference tone curve C3 has an "S"-like shape and a middle portion of the curve corresponds to the case of $\gamma=1.6$. In this embodiment, the correction by the tone curve C3 is called $\gamma$ conversion.

In some cases, the reference tone curve C3 needs to be corrected so that desired tones can be obtained. In that case, the reference tone curve is displayed on the monitor 13 and corrected by the input means 5. In this manner, the reference tone curve C3 can be corrected as desired.

Since a print generally has a narrow density reproduction range, a highlight area in an image tends to become evenly bright a shadow area thereof tends to become evenly dark. Therefore, as described in Japanese Unexamined Patent Publication No. 11 (1999)-331596 for example, the tone correction processing unit 8-c nonlinearly corrects tones of a highlight area and a shadow area so that the tones on the highlight side are hardened and the tones on the shadow side are softened in the case where the density of the print increases as a result of the printing AE/AWB processing. On the other hand, in the case where the print density decreases, the tone correction processing unit 8-c corrects the tones of the highlight area and the shadow area so that the tones on the highlight side are softened and the tones on the shadow side are hardened. In this manner, the tone correction processing unit 8-c carries out the tone correction on the image data on which the $\gamma$ conversion has been carried out by the reference tone curve C3. The tone correction processing is carried out by using a tone correction curve C4 shown in the fourth quadrant of FIG. 2.

In the case where the density of the image data obtained by the tone correction processing means 8 is adjusted for printing, the density of the entire image or each of the RGB colors can be changed by pressing down the DCMY keys 6. The changes in densities of C, M, and Y are reflected in changes in R, G, and B. More specifically, by translating the line C2 in the second quadrant in FIG. 2 in either direction shown by the arrow A according to how many times the DCMY keys 6 are pressed down, the densities of RGB in the image data are changed. By adjusting the densities with the DCMY keys 6, print density can be corrected as desired.

The color data R2, G2, and B2 comprising the image data D2 having been subjected to the tone correction processing are obtained by the processing described above.

The inverse logarithmic conversion means 9 converts the image data S2 into the image data D3 comprising the color data R3, G3, and B3, and the image data D3 are output to the miscellaneous processing means 10. The miscellaneous processing means 10 carries out processing such as color correction on the image data D3, and obtains the image data D4. The image data D4 are output to the monitor display processing unit 11. The monitor display processing unit 11 carries out the monitor display processing such as sRGB conversion on the image data D4, and converts the image data D4 into the display image data D5 to be displayed on the monitor 13. At the same time, the image data D4 are converted into the image data D6 by the printing processing such as sharpness processing, and output to the printer 14.

Figure 3:
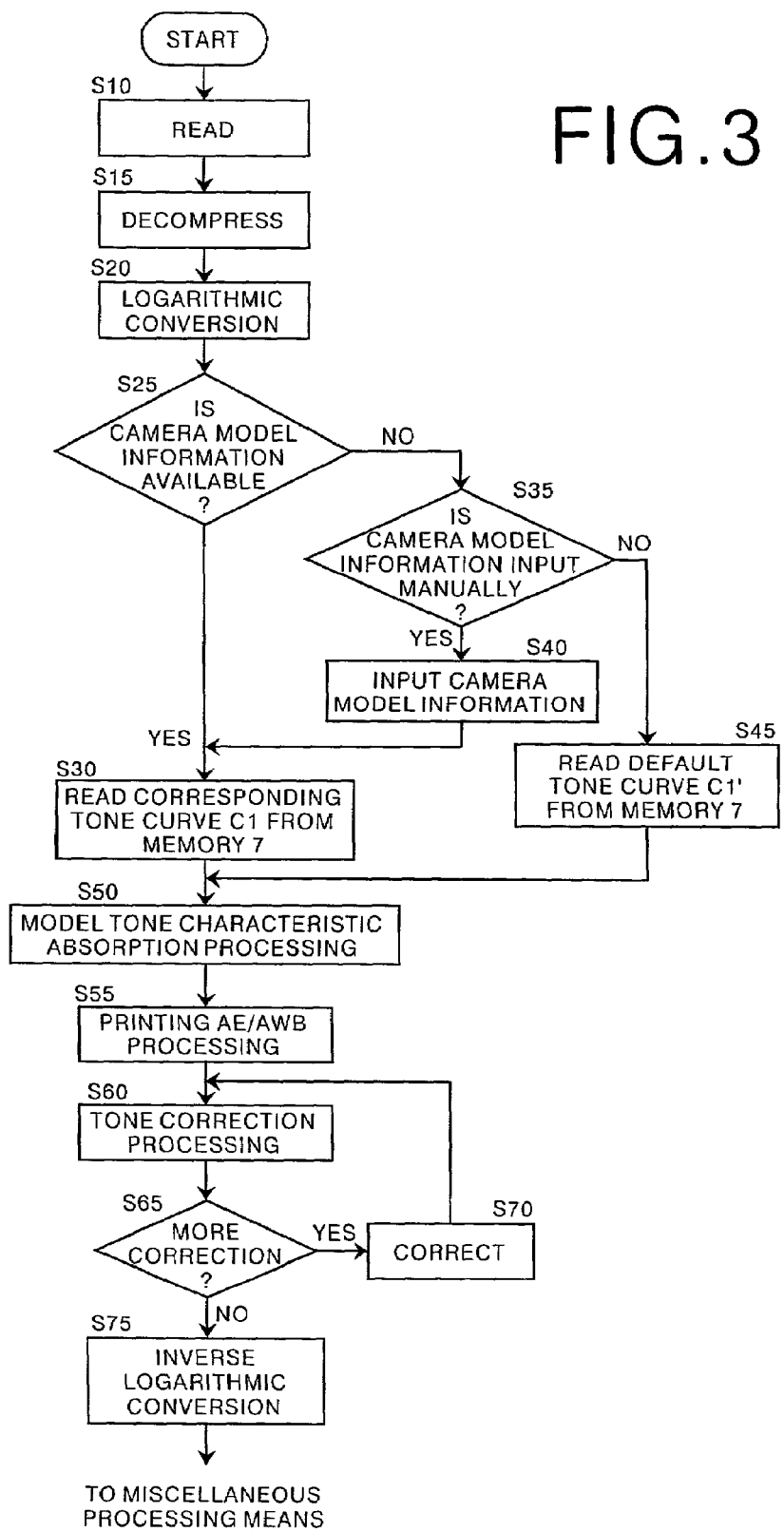
FIG. 3 is a flow chart showing a portion of operation of the image processing apparatus.

Operation of the tone correction carried out in the first embodiment will be explained next. FIG. 3 is a flow chart showing the tone correction processing carried out in the first embodiment. The image data obtained by the digital camera are read from the memory card 2 by the reading means 3 (Step S10). At this time, the camera model information is also read if the camera model information is added to the image data. The decompression means of the reading means 3 decompresses the image data and obtains the image data D0 (Step S15), and the image data DO are converted into the image data D1 by the logarithmic conversion means 4 (Step S20). The model tone characteristic absorption processing unit 8-a judges whether or not the camera model information is added to the image data D1 (Step S25). If the camera model information is available (Step S25: Yes), the model tone characteristic absorption processing unit 8-a reads the model tone curve C1 corresponding to the model of the digital camera from the memory 7 (Step S30) and carries out the processing to absorb the model tone characteristic on the image data D1 (Step S50). On the other hand, if the camera model information is not added to the image data D1 (Step S25: No) and not input from the input means 5 (Step S35: No), the model tone characteristic absorption processing unit 8-a reads the default model tone curve C1' from the memory 7 (Step S45) and carries out the model tone characteristic absorption processing on the image data D1 by using the default model tone curve C1' (Step S50). If the image data D1 do not have the camera model information (Step S25: No) but the camera model information is input from the input means 5 (Step S35: Yes), the model tone characteristic absorption processing unit 8-a reads the model tone curve C1 corresponding to the model from the memory 7 (Step S40), and carries out the model tone characteristic absorption processing on the image data D1 by using the model tone curve C1 (Step S50). The image data processed by the model tone characteristic absorption processing unit 8-a have the tone characteristic corresponding to the case of γ=1 for the subject, and the model tone characteristic of the digital camera has been absorbed. The image data after the model tone characteristic absorption are subjected to the printing AE/AWB processing for exposure correction (Step S55) and the tone correction processing using the reference tone curve C3 selected by the input means 5 and the tone curve C4 for nonlinearly correcting the highlight and the shadow areas (Step S60). If the density correction and/or the tone correction need to be carried out for printing on the image data after the tone correction processing at Step S60 (Step S65: Yes), the density is corrected by the DCMY keys 6 (Step S70), and the tones are then corrected by the tone correction processing unit 8-c (Step S60). In this manner, the image data D2 are obtained. When the density correction and/or the tone correction is completed (Step S65: No), The image data D2 are converted into the image data D3 comprising the color data R3, G3, and B3 by the inverse logarithmic conversion means 9, and output for the miscellaneous processing such as color correction (Step S70).

The miscellaneous processing means 10 carries out the miscellaneous processing such as the color correction processing on the image data D3. In the color correction processing by the miscellaneous processing means 10, correction of a color characteristic of the digital camera is carried out on the image data D3 by using a model color characteristic profile that will be explained later.

A method of generating the model color characteristic profile used by the color correction processing by the miscellaneous processing means 10 will be explained next.

Figure 4:
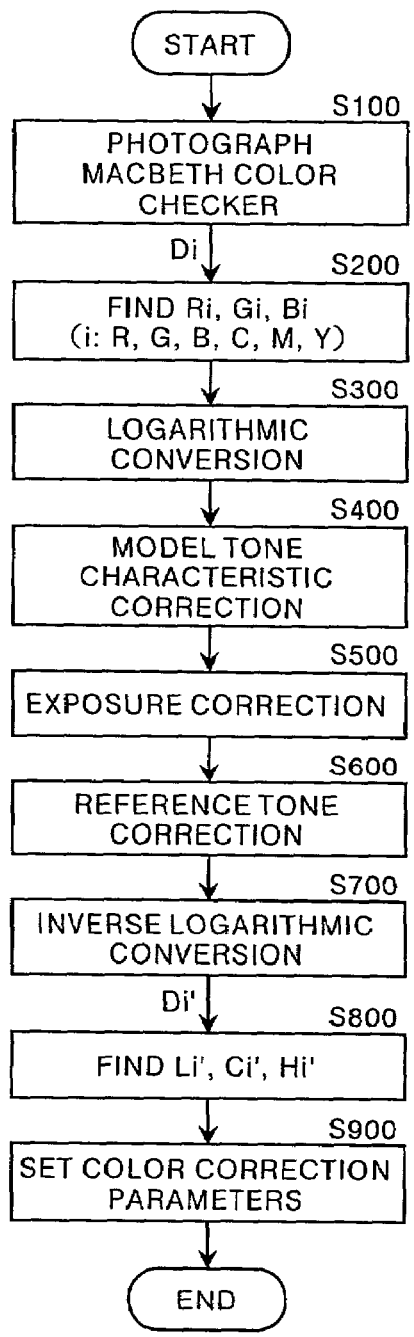
FIG. 4 is a flow chart showing a procedure for generating a model color characteristic profile used in color correction by the image processing apparatus.

FIG. 4 is a flow chart showing how the model color characteristic profile is generated in this embodiment.

As shown in FIG. 4, in this embodiment, a color chart including color patches of six colors, RGBCMY, is photographed by the digital camera and image data for setting color correction parameters are obtained. For example, Macbeth Color Checker registered by Macbeth A division Kollmorgen is photographed (Step S100). RGB values for RGBCMY (Ri, Gi, and Bi values, i: R, G, B, C, M, and Y) are extracted from the image data for setting the color correction parameters by using software such as PhotoShop by Adobe Systems Incorporated, and the Ri, Gi, and Bi values comprising the color correction parameter setting image data Di are obtained (Step S200). Since the image data Di obtained by the digital camera are according to ITU-R BT. 709 (REC. 709), logarithmic conversion is carried out on ri, gi, and bi obtained from Ri, Gi, and Bi by using Equations (1) to (3) below, and RGB densities of each of the colors (log ri, log gi and log bi) are obtained (Step S300):

$$P_R i = Ri/255 \quad (1)$$
$$P_G i = Gi/255$$
$$P_B i = Bi/255$$

$$ri = ((P_R i + 0.099)/1.099)^{2.222} \quad (2)$$
$$gi = ((P_G i + 0.099)/1.099)^{2.222} \quad (\text{if } P_R i, P_G i, P_B i \geq 0.081)$$
$$bi = ((P_B i + 0.099)/1.099)^{2.222}$$

$$ri = P_R i/4.5 \quad (3)$$
$$gi = P_G i/4.5 \quad (\text{if } P_R i, P_G i, P_B i < 0.081)$$
$$bi = P_B i/4.5$$

The model tone characteristic of the digital camera represented in the image data Di is corrected by using the model tone characteristic profile of the digital camera, and the RGB densities of RGBCMY obtained at Step S300 are converted into the logarithmic exposure (Step S400).

The data whose model tone characteristic has been corrected are subjected to the exposure correction and the reference tone correction that will be explained later (Step S500, Step S600), and then subjected to the inverse logarithmic conversion to generate ri, gi and bi (Step S700). The data ri, gi and bi are converted into CIE1931 tristimulus values Xi', Yi', and Zi' by the following Equation (4). In Equation (4) and Equations (6) to (8) below, the suffix "" is omitted. Li', Ci', and Hi' are then obtained by finding CIE1976 hue angle HA (=H), chroma C* (=C), and lightness L* (=L) in a LAB color specification system of each color based on Equations (6) to (8) below:

$$\begin{pmatrix} Xi \\ Yi \\ Zi \end{pmatrix} = |A| \begin{pmatrix} ri \\ gi \\ bi \end{pmatrix} \quad (4)$$

where the matrix $|A|$ is a matrix for converting the color data $ri'$, $gi'$, and $bi'$ into the tristimulus values $Xi'$, $Yi'$, and $Zi'$, and the following values can be used, for example:

$$|A| = \begin{pmatrix} 0.4124 & 0.3576 & 0.1805 \\ 0.2126 & 0.7152 & 0.0722 \\ 0.0193 & 0.1192 & 1.0571 \end{pmatrix} \quad (5)$$

Instead of the matrix $|A|$, a look-up table may be used to find the tristimulus values $Xi'$, $Yi'$, and $Zi'$.

$$ai^* = 500\{f(Xi/Xn) - f(Yi/Yn)\} \quad (6)$$

$$bi^* = 200\{f(Yi/Yn) - f(Zi/Zn)\}$$

$$Li^* = 116(Yi/Yn)^{1/3} - 16 \quad \text{(if } Yi/Yn > 0.008856\text{)}$$

$$Li^* = 903.25(Yi/Yn) \quad \text{(if } Yi/Yn \leq 0.008856\text{)}$$

If $Xi/Xn$, $Yi/Yn$, $Zi/Zn > 0.008856$, $$f(ai/an) = (ai/an)^{1/3} \quad (a=Xi, Yi, Zi)$$

If $Xi/Xn$, $Yi/Yn$, $Zi/Zn \leq 0.008856$, $$f(ai/an) = 7.787(ai/an) + 16/116$$

$Xn$, $Yn$, and $Zn$ are tristimulus values for white and can be substituted by tristimulus values corresponding to CIE-D65 (a light source whose color temperature is 6500 K).

$$Ci^* = (ai^{*2} + bi^{*2})^{1/2} \quad (7)$$

$$HAi = \tan^{-1}(bi^*/ai^*) \quad (8)$$

Differences between $Li'$, $Ci'$, and $Hi'$ obtained by converting $ri'$, $gi'$, and $bi'$ in the above manner and $Li$, $Ci$, and $Hi$ obtained by measuring the Macbeth Color Checker used as target values that will be explained later are found by Equation (9) below, and color correction parameters are set (Step S900):

$$\Delta Ci = \alpha c(Ci - Ci') \quad (9)$$

$$\Delta Hi = \alpha h(Hi - Hi')$$

$$\Delta Li = \alpha l(Li - Li')$$

Here, $0 \leq \alpha c$, $\alpha h$, $\alpha l \leq 1$.

The color correction parameters can be set for RGBCMY colors in the above manner, and $\Delta Ci$, $\Delta Hi$, and $\Delta Li$ are used to comprise the model color characteristic profile.

As has been described above, in the first embodiment, the image data for setting the color correction parameters obtained for generating the model color characteristic profile are subjected to the model tone characteristic correction, and the color correction parameters are corrected approximately.

In other words, as shown by Equation (9), the color correction parameters are not found to cause the values obtained by photographing to become the target values. Instead, the correction parameters are set by multiplying the differences by the coefficients $\alpha c$, $\alpha h$, and $\alpha l$. In this manner, the image data can be corrected approximately, and colors in gradation can be prevented from being ruined.

In this embodiment, the lightness, the chroma, and the hue angle are all corrected. However, the model color correction profile can be generated by adjusting the coefficients $\alpha c$, $\alpha h$, and $\alpha l$ so as to correct only one or two of the lightness, the chroma, and the hue angle.

The model tone characteristic correction, the exposure correction, and the reference tone characteristic correction at Steps S400 to S600 will be explained below with reference to FIGS. 2 and 5.

The model tone characteristic correction processing is processing to convert the RGB densities of the image data obtained by the digital camera into the logarithmic exposure, that is, the processing to correct the model tone characteristic of the digital camera represented in the image data. The "logarithmic exposure" refers to the RGB densities in the image data whose model tone characteristic has been corrected. The model tone characteristic profile of the digital camera is the model tone curve C1 in the first quadrant of FIG. 2. By using the model tone curve C1, the RGB densities of RGBCMY are converted into the logarithmic exposure.

How the model tone curve C1 is generated will be explained later.

The exposure correction processing (Step S500) in this embodiment is carried out in the following manner based on RGB values obtained by photographing a gray patch whose reflectance is 18%.

RGB densities (log r, log g, and log b) are found by using the RGB values obtained by photographing the gray patch having the 18% reflectance according to Equations (1) to (3) above (where the suffix "i" is omitted). The RGB densities are converted into the logarithmic exposure by using the model tone curve C1 shown in FIG. 2. Density correction and gray balance adjustment is carried out so that the logarithmic exposure for R, G, and B corresponds to a specific density such as 0.75 which is for a skin color. In this manner, exposure correction values Wj (j: R, G, and B) are found.

At Step S500, exposure correction processing is carried out on the image data of RGBCMY after the model tone characteristic correction using the model tone curve C1 shown in FIG. 2 at Step S400, by using the exposure correction values Wj found in the above manner.

Figure 5:
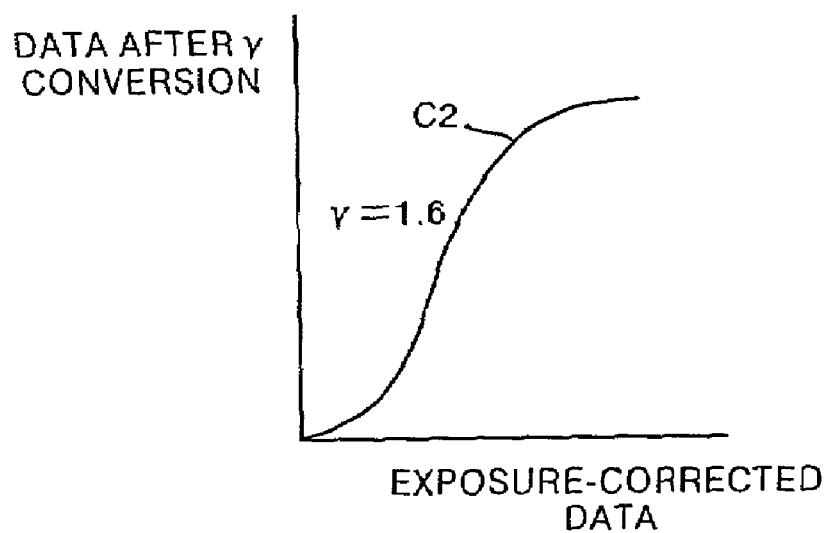
FIG. 5 is a diagram for explaining model tone correction processing carried out at the time of generating a model tone characteristic profile.

FIG. 5 is a diagram for explaining the reference tone correction processing at Step S600.

The reference tone correction processing refers to tone correction processing carried out at the time of printing the image data obtained by the digital camera in order to cause the print to look esthetic. In this embodiment, the reference tone correction processing is carried out by using a reference tone correction curve C2 shown in FIG. 5 (the same as the tone curve C3 in the third quadrant of FIG. 2), for example. The reference tone correction curve C2 has an "S"-like shape and a middle portion thereof corresponds to the case of $\gamma=1.6$. In this embodiment, the conversion by the reference tone correction curve C2 is called $\gamma$ conversion.

Data having been subjected to the $\gamma$ conversion can be obtained by the reference tone correction curve C2.

A method of finding the target values Li, Ci, and Hi used at the time of setting the color correction parameters at Step S900 will be explained next.

In this embodiment, in order to find the target values Li, Ci, and Hi (i: R, G, B, C, M, and Y) for setting the color correction parameters, RGBCMY of Macbeth Color Checker are measured by using GRETAG: SPM100-II or the like, and the tristimulus values Xi, Yi, and Zi are obtained. An inverse of the matrix |A| is found from Equation (5) by using the tristimulus values Xi, Yi, and Zi, and $r_{oi}$, $g_{oi}$, and $b_{oi}$ are found from Equation (10) below;

$$\begin{aligned} r_{oi} &= & Xi \\ g_{oi} &= |A^{-1}| & Yi \\ b_{oi} &= & Zi \end{aligned} \quad (10)$$

The processing from Step S300 to Step S800 is carried out on $r_{oi}$, $g_{oi}$, and $b_{oi}$, and Li*, Ci*, and HAi* are found.

The values of Li*, Ci*, and HAi* are used as the target values Li, Ci, and Hi.

How the model tone characteristic profile, that is, the model tone curve C1 for correcting the model tone characteristic of the digital camera, is generated will be explained next.

In order to generate the model tone characteristic profile, a gray chart is subjected to luminance measurement and photographing. For each model of a digital camera, luminance of the gray chart is measured in desired photographing conditions combining on/off of flash, sensitivity of the camera, and light source types comprising automatic, fluorescent light, tungsten light, cloudy weather, and fine weather. Values of the measured luminance of respective gray patches in the gray chart are subjected to logarithmic conversion, and logarithmic luminance values are obtained. The gray chart is photographed in an exposure condition varying from overexposure to underexposure (this photographing is called slope photographing) for each combination of the photographing conditions.

Among image data sets obtained by the slope photographing for each combination of the photographing conditions, an image data set in which the brightest gray patch has a difference from the second-brightest gray patch and is not saturated but most overexposed is selected in order not to ruin a shadow area in an image. Since the image data obtained by the digital camera are according to ITU-R BT. 709 (REC 709), color data R, G, and B comprising the image data are converted into CIE1931 tristimulus values X, Y, and Z based on Equations (1) to (4) whose suffixes i are omitted.

Based on the values of X, Y, and Z obtained in the above manner, values of logY corresponding to the respective gray patches are found. Alternatively, values of logG' found after logarithmic conversion of r, g and b may be used as the values of logY.

Based on the logarithmic luminance values and logY values of the respective gray patches, the model tone characteristic profile of the digital camera is generated. For generating the profile, the following method can be used, for example.

Figure 6:
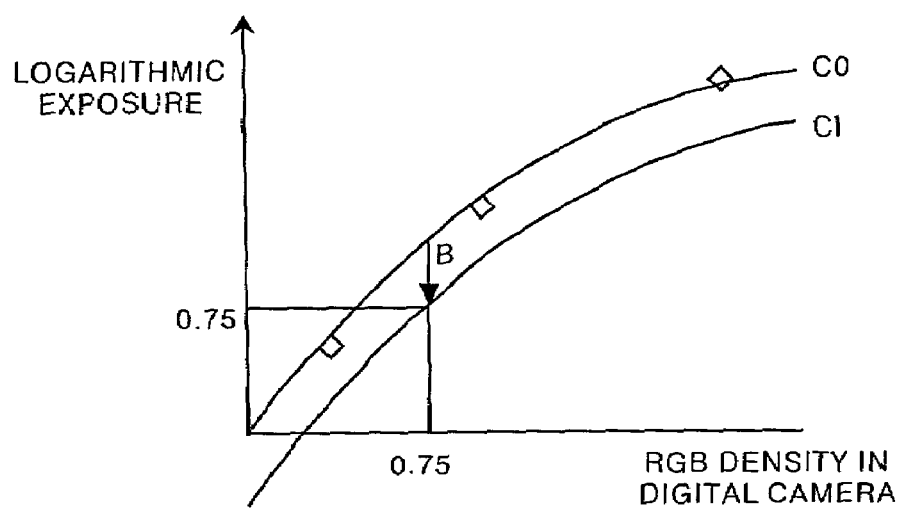
FIG. 6 is a diagram for explaining a method of generating the model tone characteristic profile.

A logarithmic luminance value corresponding to the brightest gray patch is normalized to a value 0 of logarithmic exposure, while a value of logY corresponding to the brightest gray patch is normalized to a value 0 of RGB densities in the digital camera (hereinafter called digital camera RGB densities). The logarithmic luminance values and the logY values of the respective gray patches are related to the logarithmic exposure and digital camera RGB densities, and an approximation curve C0 shown in FIG. 6 is found by using a cubic polynomial using a least square method. The approximation curve C0 may be found by using another method.

The approximation curve C0 is used as a basis for the model tone characteristic profile, and translated in a direction shown by an arrow B in FIG. 6. In this manner the model tone characteristic profile is generated. For example, AE processing of a digital camera is generally controlled to reproduce a human skin having an appropriate density, since appropriate reproduction of the skin is most desired. Therefore, the density of the skin, that is, 0.75 in this embodiment is assumed as the appropriately controlled density. By translating the approximation curve C0 in the direction shown by the arrow B so that the RGB densities 0.75 becomes the logarithmic exposure 0.75, the model tone curve C1 is obtained to be used as the model tone characteristic correction curve. If the model tone curve C1 generated in the above manner is used, an AE characteristic of the digital camera can also be absorbed in the model tone characteristic absorption processing while gray balance of an image is maintained. Therefore, the printing AE/AWB processing to be carried out later becomes simpler, which is efficient.

As has been described above, the processing to absorb the model tone characteristic is generally carried out on R, G, and B by using the same model tone curve C1, in order not to unbalance the gray balance. However, since RGB gains are generally controlled in an antilogarithmic space by the digital camera, the gray balance can be adjusted easily upon necessity by generating model tone characteristic profiles for R and B by using a difference between densities of R and G and the between densities of B and G, in the case where gray balance needs to be changed.

The model tone characteristic profile generated in the above manner does not depend on the image data obtained by the digital camera, and enables accurate correction of the model tone characteristic of the digital camera under each combination of the photographing conditions. Therefore, performance of the tone correction by analysis of the image can be prevented from becoming unstable.

In this embodiment, the curve relating the digital camera RGB densities and the logarithmic exposure is used as the model tone characteristic profile. However, any data such as a LUT can be used as the model tone characteristic profile as long as the data enable the model tone characteristic absorption processing independent from tone correction processing of another kind.

As has been described above, in this embodiment, the image data as a target of the printing AE/AWB processing and the tone correction processing are the data on which the pre-processing to absorb the model tone characteristic has been carried out by the model tone characteristic absorption unit 8-a. Therefore, analysis performance of the printing AE/AWB processing and the tone correction processing can be stabilized and the image data in a higher quality can be obtained.

In this embodiment, since the tone correction appropriate for printing is carried out after absorption of the model tone characteristic of the digital camera and the subsequent printing AE/AWB processing, the higher-quality image data can be obtained regardless of the model of the digital camera. Furthermore, the model tone characteristic profile (the model tone curve C1 in this embodiment) generated by the method shown in FIG. 6 enables the tone correction appropriate for printing to be carried out after the tone correction by the image processing apparatus of the present invention, that is, after the absorption of the model tone characteristic of the digital camera and the subsequent printing AE/AWB processing.

In this embodiment, if the camera model information is added to the image data obtained by the digital camera, the model tone characteristic absorption processing unit 8-a automatically reads the model tone curve C1 corresponding to the model of the digital camera based on the camera model information. Therefore, the model tone characteristic profile (the model tone curve C) does not need to be sent together with the image data, which leads to reduction in transmission processing and the like.

In this embodiment, the camera model information can be input manually from the input means 5. Therefore, the case where the camera model information is not added to the image data can be dealt with, which is convenient.

In the case where the camera model information is not known, such as in the case where the camera model information is neither added to the image data nor input manually from the input means 5, the processing is carried out by using the default model tone characteristic profile, which makes it possible to deal with a new model of a digital camera.

In the image processing apparatus of the present invention, since the model color characteristic profile used in color correction is generated to correct the image data approximately, colors in gradation in the image data after the color correction can be prevented from being ruined. As a result, the higher-quality image data can be obtained.

Figure 7:
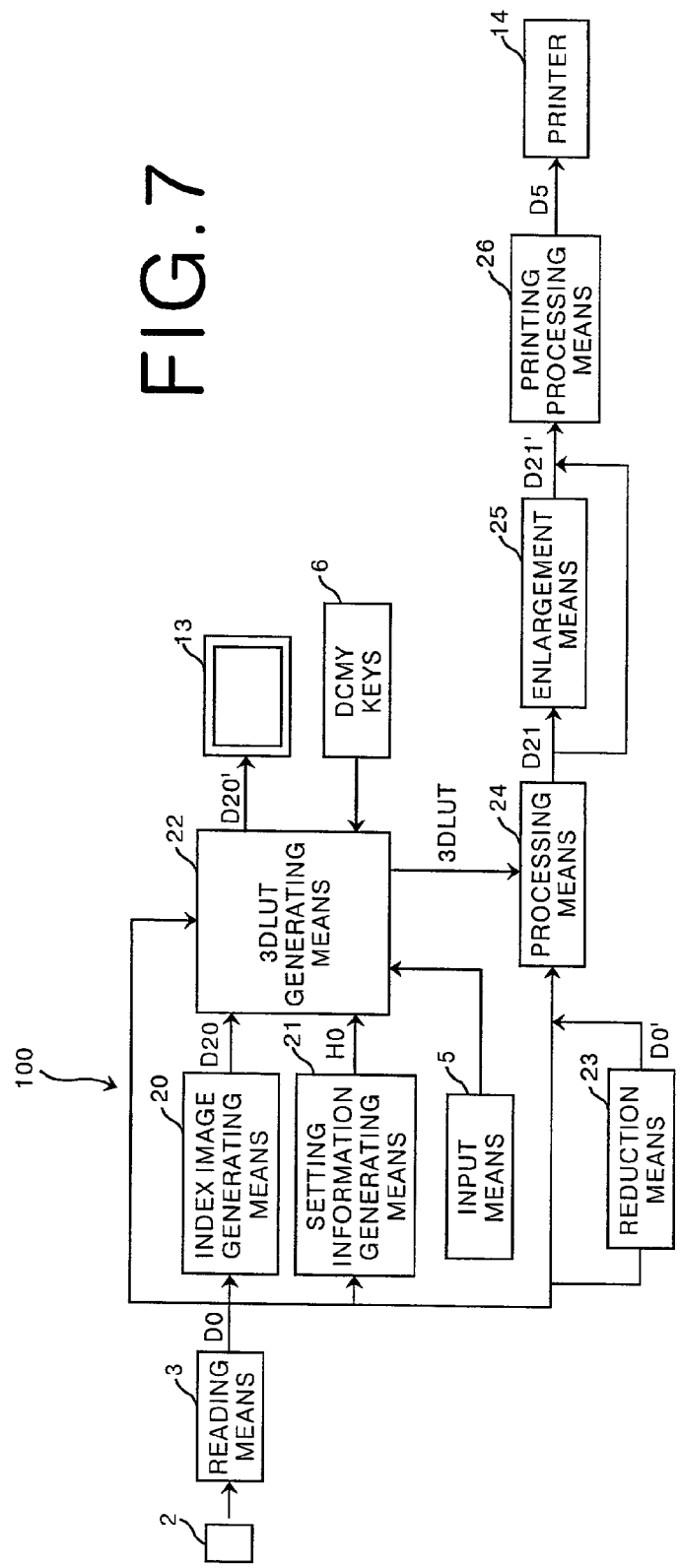
FIG. 7 is a block diagram showing a configuration of an image processing apparatus as a second embodiment of the present invention.

FIG. 7 is a block diagram showing a configuration of an image processing apparatus as a second embodiment of the present invention. In this embodiment, image processing is divided into processing for printing and processing for monitor display. In the image processing for monitor display, image data obtained by a digital camera are displayed as index images and processing conditions such as conditions for tone correction processing for printing are found. In the image processing for printing, the processing such as the tone correction is carried out based on the image processing conditions determined in the processing for monitor display, and image data after the processing are output to a printer.

As shown in FIG. 7, an image processing apparatus 100 in this embodiment comprises reading means 3 for reading compressed image data obtained by photographing a subject with a digital camera from a memory card 2 and for obtaining image data D0 comprising color data R0, G0 and B0 by decompressing the image data read from the memory card 2, index image generating means 20 for generating index image data D20 representing index images by reducing the image data D0, setting information generating means 21 for generating setting information H0 necessary for setting tone conversion tables T0 which will be explained later by analyzing the image data D0, 3DLUT generating means 22 for generating a three-dimensional look-up table (hereinafter called 3DLUT) used for carrying out desired processing such as tone correction processing and color correction processing on the image data D0 upon printing the image data D0 and for carrying out tone conversion processing on the index image data D20, a monitor 13 for displaying index image data D20' after the tone conversion processing as index images, input means 5 for carrying out various kinds of input to the 3DLUT generating means 22, DCMY keys 6 for changing density, processing means 24 for obtaining converted image data D21 by converting the image data D0 according to the 3DLUT generated by the 3DLUT generating means 22, reduction means 23 for obtaining reduced image data D0' by reducing the image data D0 in the case where the number of pixels for one image in the image data D0 is larger than the number of pixels necessary for printing the image, enlargement means 25 for obtaining enlarged image data D21' by enlarging the converted image data D21 in the case where the number of the pixels is smaller than the number of the pixels necessary for printing, printing processing means 26 for obtaining processed image data D5 by carrying out processing necessary for printing such as sharpness processing on the converted image data D21 or on the enlarged image data D21', and a printer 14 for obtaining a print P by outputting the processed image data D5.

As in the image processing apparatus 1 in the first embodiment of the present invention, the reading means 3 comprises a card reader for reading the compressed image data from the memory card 2 and decompression means for decompressing the image data that have been read. Information indicating a model of the digital camera that obtained the image data D0 (hereinafter called camera model information) is added to the image data D0 as tag information thereof. Therefore, the camera model information is also read. As a standard for recording the camera model information as the tag information, "Baseline TIFF Rev. 6.0 RGB Full Color Image" adopted as a non-compression file format of an Exif file can be used, for example. Information indicating use of flash (hereinafter called flash information) in the case of flash photographing is also included in the tag information.

The index image generating means 20 reduces the image data D0 by thinning or the like, and generates the index image data D20.

The setting information generating means 21 finds a correction amount for printing AE/AWB processing as in the case of the image processing apparatus 1 in the first embodiment, and includes the correction amount in the setting information H0. The setting information generating means 21 also finds correction amounts for nonlinearly correcting highlight and shadow of tones, in order to efficiently use a narrow density reproduction range of the print. The correction amounts are also included in the setting information H0. The setting information generating means 21 reads the tag information of the image data D0, and includes the camera model information in the setting information H0. In the case where the flash information is also included in the tag information, the flash information is also included in the setting information H0 by the setting information generating means 21.

The monitor 13 displays the index images represented by the index image data D20'. At the time of correcting tone curves as will be explained later, the tone curves are also displayed together with the index images. The number of the index images simultaneously displayed on the monitor 13 is six in this embodiment.

The input means 5 comprises a keyboard, a mouse, and the like for carrying out various kinds of inputs to the 3DLUT generating means 22. A type of tones used as a reference at the time of generating the 3DLUT (hereinafter called reference tones) is input from the input means 5. As the reference tones, tones for a standard situation, tones for cloudy weather, tones for backlight, and tones for flash photographing are selectable. By selection of one of the types of the reference tones input from the input means 5, the 3DLUT generating means 22 sets a reference tone curve representing the selected reference tones. If correction of the tone curves including the reference tone curve is needed to obtain desired tones, the tone curves are shown on the monitor 13 and corrected by an input from the input means 5.

The DCMY keys 6 comprise four keys for correcting density D of an entire image and for correcting densities of cyan (C), magenta (M) and yellow (Y), respectively. Depending on how many times each of these keys is pressed down, the density of the entire image or each of the colors can be changed by the 3DLUT generating means 22. The correction of the reference tone curve input from the input means 5 and the change of the densities input from the DCMY keys 6 are reflected in the index images displayed on the monitor 13 in real time.

Figure 8:
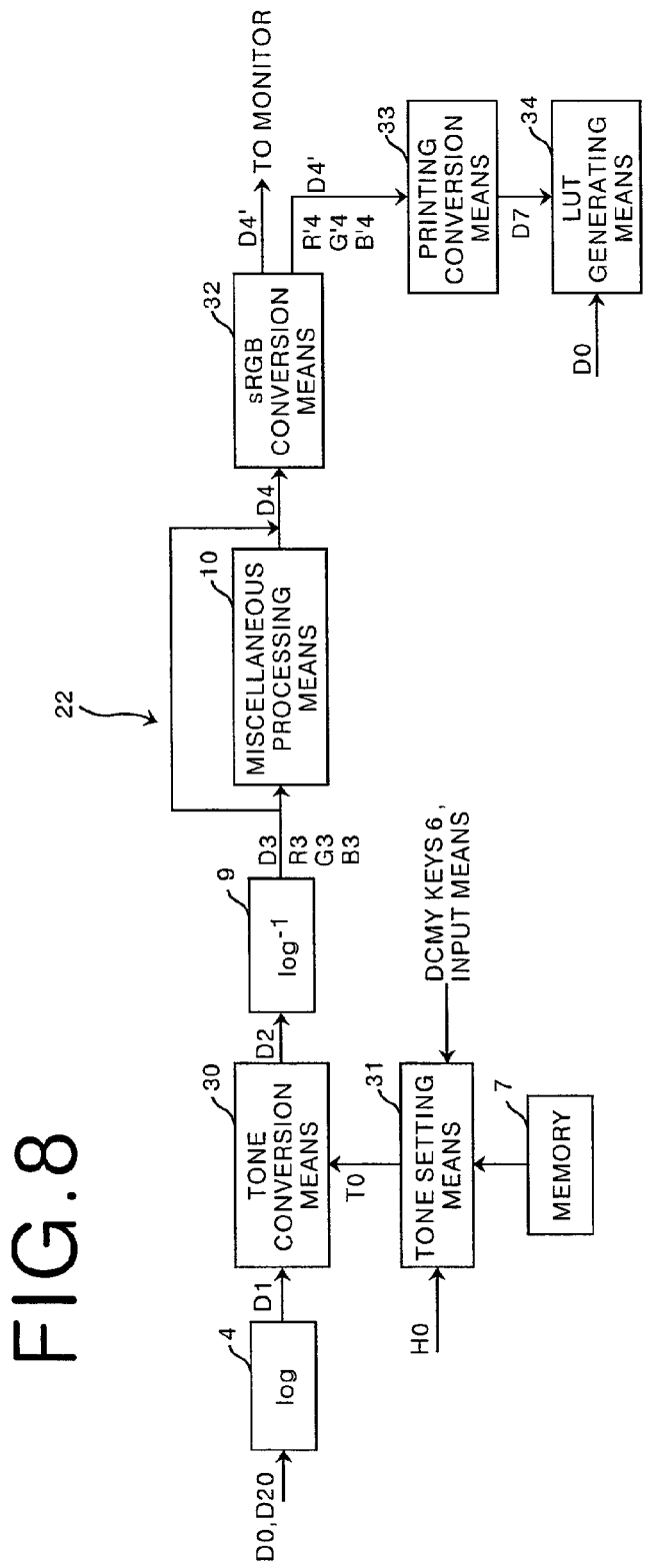
FIG. 8 is a block diagram showing a configuration of 3DLUT generating means used in the image processing apparatus in the second embodiment.

The 3DLUT generating means 22 generates the 3DLUT in the following manner. FIG. 8 is a block diagram showing a configuration of the 3DLUT generating means 22. In the case where the image data D0 comprise RGB color data having 8 bits each, $256^3$ data are needed if the 3DLUT is generated for converting all the data As a result, generation of the 3DLUT is time-consuming. Therefore, in this embodiment, the number of bits of the color data R0, G0, and B0 is reduced to generate the 3DLUT having $33^3$ data comprising 33 data for each color, namely 0, 7, 15, ..., 247 and 255.

As shown in FIG. 8, the 3DLUT generating means 22 comprises logarithmic conversion means 4 for obtaining image data D1 by carrying out logarithmic conversion on the image data D0 (having the reduced number of bits), tone conversion means 30 for obtaining image data D2 by carrying out tone conversion processing on the image data D1 after the logarithmic conversion, tone setting means 31 for setting the tone conversion tables T0 used for the tone conversion by the tone conversion means 30, a memory 7 storing a plurality of tone curves, inverse logarithmic conversion means 9 for obtaining image data D3 comprising color data R3, G3, and B3 by carrying out inverse logarithmic conversion on the image data D2, miscellaneous processing means 10 for obtaining image data D4 by carrying out desired processing such as color correction processing on the image data D3, sRGB conversion means 32 for obtaining image data D4' comprising color data R4', G4', and B4' by converting the image data D4 into an sRGB color space which is a color space for monitor display, printing conversion means 33 for obtaining print image data D7 by converting the image data D4' into a color space for printing, and LUT generating means 34 for generating the 3DLUT based on the image data D0 and the print image data D7.

The tone setting means 31 finds tone correction curves C1, C2, C3 and C4 as shown in FIG. 2, and reflects these curves in the tone conversion tables T0. The tone correction curves are the same as the tone correction curves in the first quadrant to the fourth quadrant of FIG. 2, and detailed explanation thereof is omitted. Using the tone conversion tables T0, the tone conversion means 30 converts the image data D1 and obtains the image data D2. The image data D2 are converted into the image data D3 comprising the color data R3, G3 and B3 by the inverse logarithmic conversion means 9.

The processing in the logarithmic conversion means 4, the tone conversion means 30, and the inverse logarithmic conversion means 9 is carried out in an RGB color space.

The image data D3 are then converted into the image data D4 by the miscellaneous processing means 10 which carries out the desired processing such as the color correction processing. As in the miscellaneous processing means 10 in the image processing apparatus 1 in the first embodiment, the miscellaneous processing means 10 of the image processing apparatus 100 carries out the color correction by using a model color characteristic profile generated according to the procedure shown in FIG. 4.

The image data D4 are converted by the sRGB conversion means 32 into the image data D4' by conversion to the sRGB color space which is a color space for monitor display. The printing conversion means 33 converts the image data D4' comprising the color data R4', G4' and B4' into the color space for printing, and obtains the image data D7. Based on the image data D0 and the image data D7, the LUT generating means 34 generates the 3DLUT.

In other words, the LUT generating means 34 generates the 3DLUT reflecting the processing conditions used by the tone conversion means 30, the miscellaneous processing means 10, the sRGB conversion means 32, and the printing conversion means 33. More specifically, the LUT generating means 34 finds a relationship for each of the RGB colors between the color data R0, G0, and B0 comprising the image data D0 and color data R7, G7, and B7 comprising the image data D7, and uses the relationship as the 3DLUT having $33^3$ data.

The 3DLUT generated by the 3LUT generating means 22 is input to the processing means 24 shown in FIG. 7. Based on the 3DLUT, the image data D0 are converted into the converted image data D21. Since the 3DLUT has the $33^3$ data, color data comprising the converted image data D21 are found by volume interpolation or area interpolation of the 3DLUT, as described in Japanese Unexamined Patent Publication No. 2 (1990)-87192, for example.

The number of pixels of the digital camera that obtained the image data D0 varies, and may be smaller or larger than the number of pixels necessary for printing. Therefore, if the number of the pixels of one image in the image data D0 is larger than the number of pixels necessary for printing, the reduction means 23 reduces the image data D0 before the processing by the processing means 24 and obtains the reduced image data D0'. The reduced image data D0' are converted into the converted image data D21 according to the 3DLUT. On the other hand, if the number of pixels is smaller than the number of the pixels necessary for printing, the converted image data D21 obtained by the processing means 24 are enlarged by the enlargement means 25, and the enlarged image data D21' are obtained. The image data D21 or D21' are subjected to the printing processing such as sharpness processing, and output to the printer 14 to generate the print P.

As has been described above, in the image processing apparatus 100 in the second embodiment, the processing conditions are determined when the tone conversion processing is carried out. In other words, model tone characteristic absorption processing conditions, printing AE/AWB processing conditions, and tone correction processing conditions for printing are found in the model tone characteristic absorption processing, the printing AE/AWB processing, and the tone correction processing appropriate for a reproduction apparatus. The tone conversion tables T0 are set reflecting all the processing conditions described above, and the image processing is carried out by using the tone conversion tables T0. In this manner, as in the case of the image processing apparatus 1, performance of the printing AE/AWB processing is stabilized and the image data having a high quality can be obtained.

In the image processing apparatus 100 in the second embodiment, the model color characteristic profile used in the color correction by the miscellaneous processing means 10 is generated to correct the image data approximately.

Therefore, in the image data after the color correction, colors in gradation can be prevented from being ruined, and the image data having the high quality can be obtained.

In the image processing apparatus 100 in the second embodiment, the image processing is divided into the processing for monitor display and for printing. Therefore, in the monitor display processing, the image data D0 are reduced to generate the index images displayed on the monitor. Therefore, an operator can view the index images at the same time, which leads to easier editing of the images. Furthermore, in the case where the processing such as color correction is necessary, only the tone conversion processing is carried out on the index images in the processing for monitor display, while the image data DO are converted according to the 3DLUT used for the tone conversion processing and the desired processing such as color correction. As a result, a high-quality image after the processing can be output from the printer while the image data D0 are displayed on the monitor. In this manner, operation time can be shortened, and the image processing becomes efficient.

Although the preferred embodiments of the present invention have been described above, the present invention is not limited to the above embodiments. Within the scope of the present invention, many modifications can be made thereto, by combining the embodiments above or by changing the procedure, for example.

As one of the modifications, image processing using a template can be carried out by installing an image trimming unit for carrying out trimming processing in the image processing apparatus of the present invention, for example. By carrying out the trimming processing on a composite image obtained by inserting an image obtained by photographing into a prepared template, image data obtained by photographing can be trimmed. If the tone correction processing is carried out on the image data after the model tone characteristic absorption processing is carried out thereon based on the camera model information input from the input means, a high-quality image can be obtained. If the camera model information is not input from the input means, the default model tone characteristic profile may be used in this image processing apparatus.

In the above embodiments, the image processing apparatus reads the image data from the memory card. However, the present invention is applicable to a system in which image data are received from a transmitting apparatus via a network such as LAN or WAN. In this case, the image processing apparatus of the present invention does not need transfer of the model tone characteristic profile of the digital camera together with the image data, which leads to a reduction in an amount of data transferred on the network. In this manner, a load on the network can be reduced.

What is claimed is:

1. An image processing method for obtaining processed image data by carrying out tone correction processing on image data obtained by a digital camera, the image processing method comprising the steps of:
    carrying out pre-processing according to a model of the digital camera on the image data to absorb a model tone characteristic of the digital camera of the model by using a model tone characteristic profile of the digital camera; and
    obtaining the processed image data by carrying out automatic exposure control processing and/or automatic white balance processing followed by the tone correction processing on the image data on which the pre-processing has been carried out,
    wherein a default model tone characteristic profile is used in the case where information indicating the model of the digital camera is not available.

2. An image processing method as defined in claim 1, wherein information indicating the model of the digital camera is added to the image data obtained by the digital camera.

3. An image processing method as defined in claim 1, wherein information indicating the model of the digital camera can be input manually.

4. An image processing method as defined in claim 1, wherein the image data obtained by the digital camera are compressed and the pre-processing is carried out after the image data are decompressed.

5. An image processing method as defined in claim 1, wherein the image data obtained by the digital camera can be received via a network.

6. An image processing method as defined in claim 1, wherein image data on which the tone correction processing is carried out are image data obtained by carrying out reduction processing on the image data obtained by the digital camera.

7. An image processing apparatus for obtaining processed image data by carrying out tone correction processing on image data obtained by a digital camera, the image processing apparatus comprising:
    storage means for storing model tone characteristic profiles corresponding to models of digital cameras;
    input means for inputting information indicating a model of the digital camera that obtained the image data;
    model tone characteristic absorption means for selecting one of the model tone characteristic profiles corresponding to the model of the digital camera from the storage means based on the information indicating the model of the digital camera input from the input means, and for carrying out pre-processing to absorb a model tone characteristic of the digital camera on the image data by using the model tone characteristic profiles;
    exposure and/or white balance correction means for carrying out automatic exposure control processing and/or automatic white balance processing on the image data on which the pre-processing has been carried out; and
    tone correction means for carrying out the tone correction processing on the image data obtained by the exposure and/or white balance correction means,
    wherein the storage means stores a default model tone characteristic profile, and the model tone characteristic absorption means carries out the pre-processing by using the default model tone characteristic profile in the case where the information indicating the model of the digital camera is not available.

8. An image processing apparatus as defined in claim 7, wherein the information indicating the model of the digital camera is added to the image data obtained by the digital camera and the input means reads the information indicating the model of the digital camera added to the image data obtained by the digital camera.

9. An image processing apparatus as defined in claim 7, wherein the input means enables manual input of the information indicating the model of the digital camera.

10. An image processing apparatus as defined in claim 7, wherein the image data obtained by the digital camera are compressed and the image processing apparatus further comprises decompression means for decompressing the image data for provision for the pre-processing.

11. An image processing apparatus as defined in claim 7, further comprising reception means for enabling reception of the image data obtained by the digital camera via a network.

12. An image processing apparatus as defined in claim 7, wherein image data on which the tone correction processing is carried out are image data obtained by carrying out reduction processing on the image data obtained by the digital camera.

13. A computer-readable recording medium storing a program to cause a computer to execute an image processing method for obtaining processed image data by carrying out tone correction processing on image data obtained by a digital camera, the program comprising the procedures of:

carrying out pre-processing according to a model of the digital camera on the image data to absorb a model tone characteristic of the digital camera of the model by using a model tone characteristic profile of the digital camera; and obtaining the processed image data by carrying out automatic exposure control processing and/or automatic white balance processing followed by the tone correction processing on the image data on which the pre-processing has been carried out, wherein a default model characteristic profile is used in the case where information indicating the model of the digital camera is not available.

14. A model color characteristic profile generation method comprising the steps of:

obtaining image data for setting color correction parameters by using a digital camera;

carrying out correction of a model tone characteristic of the digital camera on the image data for setting the color correction parameters with reference to a model tone characteristic profile used for correcting the model tone characteristic of the digital camera; and generating a model color characteristic profile by setting the color correction parameters for approximately correcting a model color characteristic of the digital camera represented in the image data for setting the color correction parameters on which the correction of the model tone characteristic has been carried out.

15. A model color characteristic profile generation method as defined in claim 14, wherein the model tone characteristic profile is to correct at least one of lightness, chroma, and hue of at least one color.

16. A model color characteristic profile generation method as defined in claim 14, wherein the image data for setting the color correction parameters are obtained by photographing Macbeth Color Checker with the digital camera.

* * * * *